United States Patent [19]

Saxon

[11] Patent Number: 4,982,764
[45] Date of Patent: Jan. 8, 1991

[54] HIGH CONFIDENCE TUBE PLUG

[76] Inventor: Edward G. Saxon, 230 Rampart Blvd., New Kensington, Pa. 15068

[21] Appl. No.: 412,718

[22] Filed: Sep. 26, 1989

[51] Int. Cl.⁵ .............................................. F16L 55/10
[52] U.S. Cl. ...................................... 138/89; 166/187; 166/192; 165/71
[58] Field of Search .......................... 138/89; 285/925; 166/187, 192, 180; 165/71; 524/9

[56] References Cited

U.S. PATENT DOCUMENTS

| | | | |
|---|---|---|---|
| 2,445,273 | 7/1948 | Kennedy | 285/925 |
| 2,449,616 | 9/1948 | Pennella | 285/925 |
| 3,797,805 | 3/1974 | Nielsen | 285/925 |
| 4,357,960 | 11/1982 | Han | 138/89 |
| 4,443,019 | 4/1984 | Ishido et al. | 277/227 |
| 4,760,868 | 8/1988 | Saxon | 138/89 |

Primary Examiner—Harvey C. Hornsby
Assistant Examiner—Gary K. Graham
Attorney, Agent, or Firm—Parmelee, Miller, Welsh & Kratz

[57] ABSTRACT

A high confidence tube plug for sealing the bore of a tube against fluid flow has an elastomeric sleeve for sealing the tube. An axially aligned hydroscopic disk swells when contacted with water to frictionally grip the tube. The sleeve and the disk are fastened together by a bolt and nut arrangement.

7 Claims, 1 Drawing Sheet

HIGH CONFIDENCE TUBE PLUG

BACKGROUND OF THE INVENTION

This invention relates to plugs which are inserted into the bores of fluid carrying tubes and the like to prevent fluid flow therethrough and more particularly to plugs in which there is high confidence that the plugs will not fail in service.

This invention is useful in fluid containing equipment where plugs are subject to high pressures and for temperatures, high differentials and vibrations all of which tend to loosen the plugs over time. Plugs embodying this invention are particularly useful to plug condenser tubing in steam power generation systems where the plugs are subjected to operating cycles including pressure differentials of up to about 200 psig, temperature changes of up to about 400° F., and relatively high vibrations. U.S. Pat. No. 4,760,868 to Edward G. Saxon discloses a high confidence tube plug for such systems, which patent is hereby incorporated by reference. This patent generally discloses a plug having a tube sealing sleeve which is fastened to axially aligned gripping elements by a bolt and nut arrangement. The gripping elements are urged into frictional gripping contact with the tube wall by torquing the fastener arrangement.

SUMMARY OF THE INVENTION

The present invention is an improvement upon the plug disclosed by U.S. Pat. No. 4,760,868. A high confidence plug embodying the present invention does not need to be torqued to frictionally grip the tube wall. Rather, plugs embodying the present invention frictionally grip the tube wall merely by absorbing fluid.

A plug embodying the present invention has an elastomeric sealing means generally having an axis for sealing a tube, pipe or the like against fluid flow therethrough. An axially aligned hydroscopic friction gripping means swells when contacted with water (or steam) to frictionally grip the tube, pipe or the like. The sealing means and the friction gripping means are held together by a holding means, which preferably is a bolt and nut arrangement.

In a preferred embodiment of the invention, the hydroscopic friction gripping means comprises laminations of hydroscopic materials which extend continuously throughout an otherwise strong stabile matrix such as canvas fiber threads in a phenolic resin. Such materials readily absorb water into a substantial portion of the laminated structure for swelling into gripping relation with the tube, pipe or the like and with a holding bolt (where employed as a holding means). Thus the water (or steam) inherently urges the friction gripping means in operative relationship with the tube, pipe or the like.

Other details, objects and advantages of the invention will befome apparent as the following description of a present preferred embodiment thereof proceeds.

BRIEF DESCRIPTION OF THE DRAWINGS

The accompanying drawings show a presently preferred embodiment of the invention in which.

DETAILED DESCRIPTION OF THE INVENTION

Figure 1:
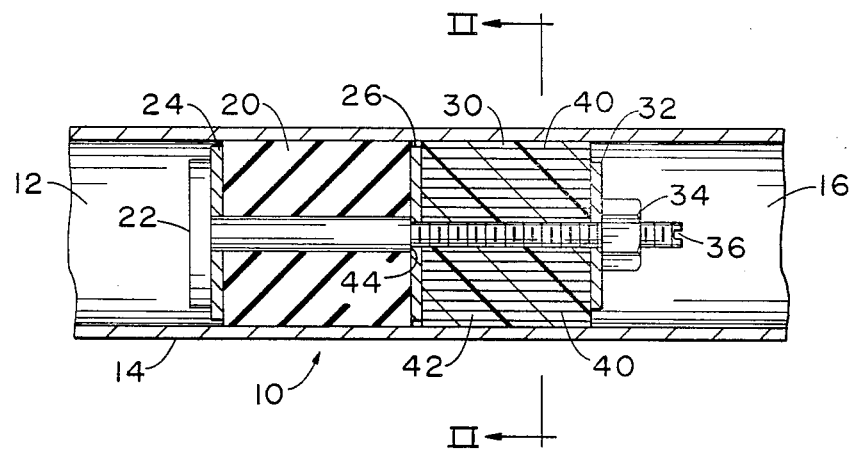
FIG. 1 is a side elevational cross-sectional view of a plug embodying the present invention in a tube.
Figure 2:
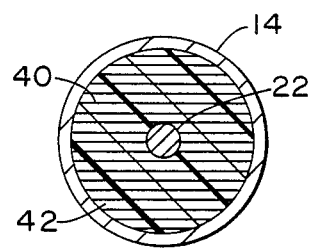
FIG. 2 is a sectional view of the plug of FIG. 1, taken along section line 2–2.

FIG. 1 generally shows a high confidence plug 10 embodying the present invention inserted in the bore 12 of a tube 14, which may be tubing, a conduit in a tube sheet, a pipe, a nipple, or the like, as it would be installed to prevent the flow of fluid. For purposes of discussion, it is assumed that the fluid is water (which could be steam or steam condensate) on side 16 of the plug 10. Where the process fluid is not water, water may nevertheless be employed to clean out the system before it is started up.

The plug 10 generally has an elastomeric sealing means such as a sleeve 20 which is compressed against the tube 14. Preferably the elastomeric material is a rubber such as neoprene or natural rubber. The sleeve 20 has a bolt 22 or other fastening means axially extending therethrough with washers 24, 26 at each of its ends for confining the sleeve 20. Preferably the sleeve 20 friction fits on the bolt 22 and with the tube 14 so that the sleeve 20 need not be extensively deformed to form a substantially fluid tight seal with the tube 14.

A hydroscopic friction-gripping means such as a disk 30 is axially aligned with the sealing sleeve 20 on the bolt 22 between the washer 26 and a third washer 32. The sleeve 20 and disk 30 are held on the bolt 22 by means of a nut 34 threadedly engaged therewith. The bolt 22 has a slot 36 which enables the assembly to be tightened from end 16 of the tube. The disk 30 is preferably a hydroscopic material such as a lamination of canvas fiber threads 40 in a phenolic resin 42. Such resins are considerably harder than elastomers such as neoprene and will transmit substantial forces to the sleeve 20 while swelling in the bore 12. A particularly suitable disk absorbs up to about 29 water; ASTM D-619 Test Method E-1/105 +2 hours with a 0.062 inch thick test specimen. Also, the disk is preferably an electric insulator so that there are no corrosion cells between the tube 14 and the holding means. Preferably the inner and outer diameters of the disk 30 fit the bolt 22 and tube 14 with minimal clearances so that the hydroscopic material need swell only a minimal amount to frictionally grip the bolt 22 and the tube 14. A small clearance is, however, desirable to permit water to quickly come into contact with the periphery of the disk 30. Most fluid will be absorbed into the disk about the periphery of the third end washer 32.

The confidence plug 10 is initially inserted into the bore 12 of the tube as an assembled unit and the nut is tightened until finger tight. The assembly is then tightened with a wrench and screw driver to seal the sleeve 20 and the tube 14. The end 16 of the tube 14 is then filled with water (or steam) and the disk 30 begins to swell after the water has been in contact with the canvas fiber threads 40. The disk 30 swells radially and thereby frictionally grips the tube 14. The disk 30 may slightly swell axially (but only until it engages shoulder 44 of bolt 22) to compress the elastomeric sleeve 20 in sealing contact with the tube 14 and the bolt 22.

The plug 10 may be easily removed from a tube by drilling the disk 30.

While a presently preferred embodiment of the invention has been shown and described, it is to be distinctly understood that it is not limited thereto but may be otherwise variously employed within the scope of the following claims.

What is claimed is:

1. A high confidence plug for insertion in the bore of a fluid carrying tube, pipes or the like, comprising:
    an elastomeric sealing means generally having an axis, for sealing a tube, pipe or the like against fluid flow therethrough;
    a hydroscopic friction gripping means axially aligned with the elastomeric sealing means, which swells when contacted with water, for gripping the tube, pipe or the like; and
    means for holding the sealing means and the gripping means together, comprising a threaded bolt and nut with the threaded portion of the bolt extending through at least a portion of said hydroscopic friction gripping means, and an end washer between said nut and hydroscopic friction gripping means.

2. The high confidence plug of claim 1, wherein the gripping means comprises laminations of hydroscopic material in a dimensionally stable matrix.

3. The high confidence plug of claim 1, wherein the gripping means comprises laminations of canvas fiber threads in a dimensionally stable matrix.

4. The high confidence plug of claim 3, wherein the dimensionally stable matrix comprises a phenolic resin.

5. The high confidence plug of claim 1, wherein the threaded portion of the bolt extends through the gripping means.

6. The high confidence plug of claim 1, wherein a washer is disposed between the sealing means and the hydroscopic friction gripping means and the bolt has a shoulder adapted to abut the washer.

7. The high confidence plug of claim 1, wherein the holding means is metallic and the gripping means is an electrical insulator.

* * * * *